(12) United States Patent
Cao

(10) Patent No.: US 10,239,646 B2
(45) Date of Patent: Mar. 26, 2019

(54) GLOVE PICKING, ORGANIZING, AND STACKING APPARATUS

(71) Applicant: Shandong Reebow Automation Equipment Co., LTD., Zibo (CN)

(72) Inventor: Yuguo Cao, Zibo (CN)

(73) Assignee: SHANDONG REEBOW AUTOMATION EQUIPMENT CO., LTD (CN)

( * ) Notice: Subject to any disclaimer, the term of this patent is extended or adjusted under 35 U.S.C. 154(b) by 0 days.

(21) Appl. No.: 15/558,995

(22) PCT Filed: Mar. 7, 2016

(86) PCT No.: PCT/CN2016/000113
§ 371 (c)(1),
(2) Date: Sep. 15, 2017

(87) PCT Pub. No.: WO2016/145932
PCT Pub. Date: Sep. 22, 2016

(65) Prior Publication Data
US 2018/0244415 A1    Aug. 30, 2018

(30) Foreign Application Priority Data

Mar. 17, 2015   (CN) ...................... 2015 2 0149187 U
Jun. 16, 2015   (CN) .......................... 2015 1 0330549
Jan. 29, 2016   (CN) ...................... 2016 2 0089933 U

(51) Int. Cl.
*B65B 35/50*   (2006.01)
*B65B 57/20*   (2006.01)
(Continued)

(52) U.S. Cl.
CPC .............. *B65B 35/50* (2013.01); *B65B 35/38* (2013.01); *B65B 57/20* (2013.01); *B65G 13/02* (2013.01); *B65G 15/16* (2013.01); *B65G 57/04* (2013.01)

(58) Field of Classification Search
CPC ......... B65B 35/50; B65B 57/20; B65G 13/02; B65G 15/16; B65G 57/04
(Continued)

(56) References Cited

U.S. PATENT DOCUMENTS 3,013,302 A * 12/1961 Croxton ................. B29C 41/14
                                                            264/303
5,924,547 A *  7/1999 McInnes ................ B65G 47/24
                                                            198/407
(Continued)

FOREIGN PATENT DOCUMENTS

CN         2014472679        5/2010
CN          102441959        5/2012
(Continued)

*Primary Examiner* — Douglas A Hess
(74) *Attorney, Agent, or Firm* — Garcia-Zamor IP Law; Ruy M. Garcia-Zamor

(57) ABSTRACT

Provided is a glove picking, organizing, and stacking apparatus, belonging to the field of equipment for producing PVC, nitrile, and latex gloves, and comprising a glove-picking apparatus (2), a correcting conveying apparatus, a conveying and placing apparatus, and a front/back stacking, conveying, and taking apparatus; the glove-picking apparatus (2) is connected to the front/back stacking, conveying, and taking apparatus by means of the correcting conveying apparatus or the conveying and placing apparatus; a system control apparatus is connected to the described apparatuses and controls their switching and operation, thereby automatically carrying out the entire process of picking, transporting, stacking, and counting the gloves, and the quality of and efficiency in the completion of the tasks is very high.

11 Claims, 13 Drawing Sheets

(51) Int. Cl.
*B65G 13/02* (2006.01)
*B65B 35/38* (2006.01)
*B65G 15/16* (2006.01)
*B65G 57/04* (2006.01)

(58) Field of Classification Search
USPC .................. 198/359, 809, 836.1, 836.2, 866
See application file for complete search history.

(56) References Cited

U.S. PATENT DOCUMENTS

| | | | |
|---|---|---|---|
| 8,650,842 B2 * | 2/2014 | Stollery | B65B 25/20 |
| | | | 100/229 A |
| 8,855,810 B2 * | 10/2014 | Chuah | B25J 9/0093 |
| | | | 134/113 |
| 9,090,427 B2 * | 7/2015 | Stollery | A61L 2/18 |
| 9,315,353 B2 * | 4/2016 | Stollery | B65H 29/24 |
| 10,098,699 B1 * | 10/2018 | Buck | A61B 19/045 |
| 2004/0149788 A1 * | 8/2004 | Sato | |
| 2012/0204517 A1 * | 8/2012 | Stollery et al. | |

FOREIGN PATENT DOCUMENTS

| | | |
|---|---|---|
| CN | 103419313 | 12/2013 |
| CN | 203888112 | 10/2014 |
| CN | 203889132 | 10/2014 |
| CN | 104925306 | 9/2015 |
| CN | 204737076 | 11/2015 |
| WO | 2014037701 | 3/2014 |

\* cited by examiner

GLOVE PICKING, ORGANIZING, AND STACKING APPARATUS

CROSS REFERENCE TO RELATED APPLICATIONS

This application claims priority to the following Patent Application: (1) PCT application PCT/CN2016/000113, entitled "GLOVE PICKING, ORGANIZING, AND STACKING APPARATUS" filed Mar. 7, 2016; (2) Chinese patent application CN201520149187.1, filed Mar. 17, 2015; (3) Chinese patent application CN201510330549.1, filed Jun. 16, 2015; and (4) Chinese patent application CN201620089933.7, filed Jan. 29, 2016. The above-identified applications are hereby incorporated by reference in entirety as if fully set forth herein.

BACKGROUND

1. Technical Field

The invention relates to the field of equipment for producing PCV, nitrile, and latex gloves, and more particular, relating to full-automatic equipment capable of automatically controlling picking, conveying, front/back stacking and counting of gloves.

2. Description of Related Art

At this stage, the plastic glove production line mainly includes PVC, nitrile, latex gloves and other types. The glove production stream line has double-row (commonly known as one-hand mold line) or four-row hand mold (commonly known as two-handed mold) continuous operation and production, with a running speed of 120-180 glove/min.

Glove production process contains several working procedures of the circulation of hand mold dipping, glove drying molding, glove semi-demolding, glove picking and packaging, etc. As shown in FIG. 2, after the gloves pass by means of the semi-demolding procedures in the production line, the length of the demolded wrist will be different, so that the semi-demolded gloves, after entering into the picking and packaging procedure, will also be configured in different positions of the picking conveyor belt even if the gloves are picked at the same time. The packaging quality at the next step will certainly be affected unless the intervention of manual adjustment.

Now the traditional glove picking equipment, after removal of gloves, cannot automatically adjust the position of the gloves on the conveyor belt, the gloves are not arranged regularly, and the stacking and packaging efficiency is low. In addition, in the traditional technology, a pneumatic gripping mechanism is almost adopted to complete the working procedures of picking the gloves from the conveyor belt, and stacking to enter into the overlapping or packaging procedures. Due to the high motion frequency, pneumatic components are easy to damage, which needs regular downtime maintenance, so that the maintenance cost is high.

The usual requirement for glove packaging is a box of 100 gloves, and the fingertips and wrists of every 25 gloves need to be placed reversely and alternately, which facilitates the regular overlapping and boxing of gloves. The existing traditional glove packaging equipment, after the completion of the count of the gloves, generally uses two kinds of boxing way: one is to complete the alternate and reverse overlapping and placing the fingertips and wrists of the gloves in the way of rotating every 25 gloves at 180 by means of the rotation of the manipulator. With this method, the gloves will rotate at high speed in the air, which is prone to falling down or losing the gloves, and will make the stacked gloves shaking, to arrange irregularly, thereby reducing the uniformity of glove yards. Another method is to complete in the way of manually rotating and stacking after gripping by means of the roller. This method has low efficiency, the placement uniformity depends on the seriousness of the workers. Because the labor intensity is very high due to such way, it is difficult to ensure the stability of the packaging quality. With the development of the international situation, the demand for packaging quality is increasing more and more, so now the glove manufacturers are looking for new programs to improve the packaging quality.

In order to improve the drawbacks of the existing glove packaging equipment in terms of picking, conveying, counting and stacking, the applicant has developed the technical solution to solve the above problems.

SUMMARY

The technical problem to be solved in the present invention is to provide a glove picking, organizing, and stacking apparatus, which may automatically complete the whole process of picking, conveying, stacking and counting the glove, with high quality and high efficiency.

In order to solve the above technical problems, the technical solutions of the present invention is to provide a glove picking, organizing, and stacking apparatus, comprising a system control apparatus and a front/back stacking, conveying, and taking apparatus; wherein the system control apparatus comprises a sense counter; the system control apparatus is connected to and controls the front/back stacking, conveying, and taking apparatus; the front/back stacking, conveying, and taking apparatus comprises a glove temporary storage portion, the glove temporary storage portion is engaged with a glove receiving and conveying portion and/or a glove conveying and taking portion;

the glove temporary storage portion comprises at least a temporary storage group, each temporary storage group comprises at least a longitudinally arranged transition case bin, an upper end of the transition case bin is opened, and a lower portion of the transition case is provided with a bin gate capable of automatically opening and closing; and the glove receiving and conveying portion is arranged below the glove temporary storage portion; the glove receiving and conveying portion comprises a rotating case bin, the rotating case bin is mounted on a first moving apparatus; an upper end of the rotating case bin is opened, and a lower portion of the rotating case bin is provided with a bin gate capable of automatically opening and closing.

Preferably, the glove receiving and conveying portion further comprises a rotating apparatus, the rotating apparatus comprises a case bin turntable, a rotating power transmission group, a rotating motor and a mounting rack; the rotating case bind is mounted on the case bin turntable, the case bin turntable is provided with a feeding port, the bin gate of the rotating case bin may be opened in the feeding port; the case bin turntable is arranged on the mounting rack and may freely rotate on the mounting rack; and the rotating motor drives the case bin turntable and the rotating case bin to rotate via the rotating power transmission group.

Preferably, the transition case bin or the rotating case bin comprises a bin body, the bin body is provided with a bin gate opening and closing mechanism; the bin gate opening and closing mechanism comprises an opening and closing power mechanism, a bin gate hinge, a connecting rod and a beam; the opening and closing power mechanism is mounted on the bin body, a telescopic shaft of the opening and closing power mechanism is connected with the beam, the beam is hinged with the connecting rod, the other end of the connecting rod is hinged with the bin gate hinge, the bin gate is mounted at a lower portion of the bin body via the bin gate hinge; the system control apparatus may control the telescopic shaft of the opening and closing power mechanism to push out and withdraw, thereby driving the beam and the connecting rod to move, and the connecting rod drives the bin gate to rotate along a spindle of the bin gate hinge, so as to achieve the automatically opening and closing of the bin gate.

Preferably, the temporary storage group is an overlapping and stacking apparatus, the overlapping and stacking apparatus comprises a power mechanism and two groups of vertically arranged closed type endless conveyor belts, the power mechanism drives adjacent side faces of the two endless conveyor belts to convey downward in a synchronous manner; the endless conveyor belt is fixed with a plurality of supporting boards; the supporting boards at both sides driven by the endless conveyor belt may be abutted between the two endless conveyor belts, to form a downward moving temporary glove supporting platform; and each temporary glove supporting platform and a storing space thereabove form a transition case bin.

Preferably, the glove conveying and taking portion comprises a transfer case bin, a second moving apparatus and a glove taking apparatus, the transfer case bin is mounted on the second moving apparatus; a front end of the second moving apparatus is located at a lower portion of the first moving apparatus; an end of the second moving apparatus is provided with the glove taking apparatus, the glove taking apparatus may take out the stacked gloves in the transfer case bin.

Preferably, a bottom board and at least one side wall of the transfer box bin are strip-like grating; the glove taking apparatus comprises a taking power unit and a taking claw, the taking claw is in a shape of fish fork, the taking power unit may drive the taking claw to move up and down; when the transfer case bin is located at a front end of the second moving apparatus, the taking power unit drives the taking claw to locate at a lower portion, when the transfer case bin is located at an end of the second moving apparatus, the taking claw is inserted in the lower portion of the bottom board, the taking power unit may drive the taking claw to move upward and pass by means of a grating clearance between the bottom board and the side wall of the transfer case bin, to take the glove out.

Preferably, the glove picking, organizing, and stacking apparatus further comprises a conveying and placing apparatus, wherein the system control apparatus is connected to and controls the conveying and placing apparatus, the conveying and placing apparatus comprises a glove conveying portion, the glove conveying portion comprises an upper conveyor belt and a lower conveyor belt, a glove clamping and conveying space is formed between the upper and lower conveyor belts, the upper and lower conveyor belts clamp and convey the glove along the same direction; the glove conveying portion is abutted with the glove temporary storage portion, and the glove conveying portion may clamp and convey and place the glove on the glove temporary storage portion by means of movement inertia.

Preferably, the glove conveying portion further comprises a down-pressing type steering conveyor belt, an upper end of the down-pressing type steering conveyor belt and the end of the upper conveyor belt are engaged or coaxially mounted with each other, and a lower end of the down-pressing type steering conveyor belt points to an anticipated placing position of the glove.

Preferably, the glove picking, organizing, and stacking apparatus further comprises a correcting conveying apparatus, wherein the system control apparatus is connected to and controls the correcting conveying apparatus, the correcting conveying apparatus comprises a glove correcting conveying portion; the glove correcting conveying portion comprises a glove conveying mechanism and a glove position detecting mechanism; the glove conveying mechanism comprises a power conveying apparatus and a conveyor belt, the power conveying apparatus and the conveyor belt compose a picking conveyor belt group; and the glove position detecting mechanism is connected to and control the operation of the power conveying apparatus.

Preferably, the glove picking, organizing, and stacking apparatus further comprises a glove placing portion, wherein the correcting conveying apparatus or the glove conveying portion are engaged with the glove temporary storage portion via the glove placing portion;

when the correcting conveying apparatus is engaged with the glove temporary storage portion via the glove placing portion, the glove placing portion comprises a glove moving and absorbing apparatus, the glove moving and absorbing apparatus may absorb and transfer the gloves on the conveyor belt of the glove conveying mechanism, and place the gloves in the glove temporary storage portion;

when the glove conveying portion is engaged with the glove temporary storage portion via the glove placing portion, the glove placing portion comprises a tiling and placing conveyor belt and a glove moving and absorbing apparatus; the glove conveying portion conveys the gloves on the tiling and placing conveyor belt, the glove moving and absorbing apparatus may absorb and transfer the gloves on the tiling and placing conveyor belt, and place the glove in the glove temporary storage portion;

the glove moving and absorbing apparatus comprises at least two structural forms:

the glove moving and absorbing apparatus comprises a reciprocating mobile lifting chuck group, and the reciprocating mobile lifting chuck group comprises at least a chuck capable of reciprocating translating and lifting up and down;

or the glove moving and absorbing apparatus comprises a belt absorbing mechanism, the belt absorbing mechanism comprises a belt power roller, a belt with hole, a vacuum cavity and a glove peeling board, the belt power roller drives the belt with hole to rotate; the vacuum cavity is connected with a vacuum system; the glove peeling board is arranged below the belt with hole, and the glove peeling board is tangent to the belt with hole.

Compared to the prior art, the present invention has the advantageous effects as follows:

1. when picking the gloves, the picking conveyor belt group is operated at a high speed, so that the picked gloves are tiled well; after picking the gloves, this apparatus may use the correcting conveying apparatus or the conveying and placing apparatus to achieve the smooth conveying operation.

2. when using the correcting conveying apparatus, the gloves are detected on the conveyor belt by means of the sensor to stop, so that the glove wrists may be in a line to facilitate the follow-up tacking and stacking operations. The invention can adapt to the conveyance of more than one glove, facilitate the single positioning or multi-alignment of the glove, and the subsequent absorbing and stacking, and the production efficiency is extremely high.

3. when using the conveying and placing apparatus, the gloves are conveyed by means of a holding and conveying space between the upper and lower conveyor belts, the gloves are thrown out from the holding and conveying space after generating motion inertia, to directly fall to expected placing position. Because point-to-point one-time conveyance in place is achieved by this apparatus, no alignment apparatus is needed to assist to place or overlap and stack the gloves regularly. This design makes the apparatus structure more concise and practical.

4. the glove conveying portion of the conveying and placing apparatus may be directly connected to the glove temporary storage portion, and may also be connected to the glove temporary storage portion by tiling and placing conveyor belt, producers may choose according to production needs free. In addition, the above-mentioned combination of the structure cannot only realize the conveying operation of the single-row glove production line, but also can meet the conveying, tiling and placing or overlapping tasks of the multi-row glove production lines, which is flexible to use, and has adaptability, so that the production efficiency is doubled.

5. The gloves in the front/back stacking and counting processes are always stored in the bib body in the temporary, rotation, transferring and taking process. There is no high-speed rotation and motion process of the manipulator, so that gloves are not lost, to ensure the accurate counting. On the other hand, the follow-up conveying and rotation process of the gloves is slow, so that the stacking of the gloves is not easy to loosen, to ensure the stacking uniformity of gloves. Moreover, the number of each stack of gloves may be regulated according to the arrangement of the system control apparatus, to complete the regular boxing of 100 gloves, and regular boxing of non-100 gloves, so that the operation is more flexible and convenient.

Reference number in drawings are as follows in sequence:
- 1 Glove production stream line: 1.1 glove production line; 1.2 hand model; 1.3 glove;
- 2 glove picking apparatus: 2.1 picking rack; 2.2 picking motor; 2.3 picking power transmission group; 2.4 picking semi-roller; 2.5 glove detecting apparatus;
- 3 glove correcting and conveying portion: 3.1 power conveying apparatus; 3.2 conveyor belt; 3.3 glove position detecting mechanism;
- 4 glove moving and absorbing apparatus (structure 1): 4.1 power lifting apparatus; 4.2 sliding block; 4.3 frame; 4.4 lifting suspender; 4.5 lifting frame; 4.6 linear guideway; 4.7 chuck; 4.8 power reciprocating apparatus;
- 5 glove moving and absorbing apparatus (structure 2): 5.1 driving wheel; 5.2 driven wheel; 5.3 driving wheel; 5.4 driven wheel; 5.5 chuck; 5.6 chuck; 5.7 chuck; 5.8 chuck; 5.9 chuck;
- 6 glove moving and absorbing apparatus (structure 3): 6.1 belt with hole; 6.2 vacuum cavity; 6.3 glove peeling board; 6.4 belt power roller; 6.5 rack;
- 7 glove conveying portion: 7.1 upper conveyor belt; 7.2 lower conveyor belt; 7.3 down-pressing type steering conveyor belt;
- 8 overlapping and stacking apparatus: 8.1 endless conveyor belts; 8.2 supporting board; 8.3 supporting board; 8.4 endless conveyor belts;
- 9 glove moving and absorbing apparatus (structure 4): 9.1 reciprocating guideway; 9.2 lifting cylinder; 9.3 chuck;
- 10 tiling and placing conveyor belt; 11 power mechanism
- 12 glove temporary storage portion: 12.1 temporary storage group; 12.2 temporary storage group;
- 13 glove receiving and conveying portion; 14 glove conveying and taking portion; 15 glove taking apparatus; 16 transition case bin; 17 transition case bin; 18 rotating motor; 19 belt; 20 rotating case bin; 21 first moving apparatus; 22 conveyor belt; 23 machine frame; 24 case bin turntable; 25 moving motor; 26 transfer case bin; 27 taking claw; 28 taking power unit; 29 second moving apparatus; 30 bin body; 31 case bin fixing board; 32 opening-closing cylinder; 33 cylinder support; 34 telescopic shaft; 35 bin gate hinge; 36 connecting rod; 37 bin gate; 38 beam.

DETAILED DESCRIPTION

Figure 1:
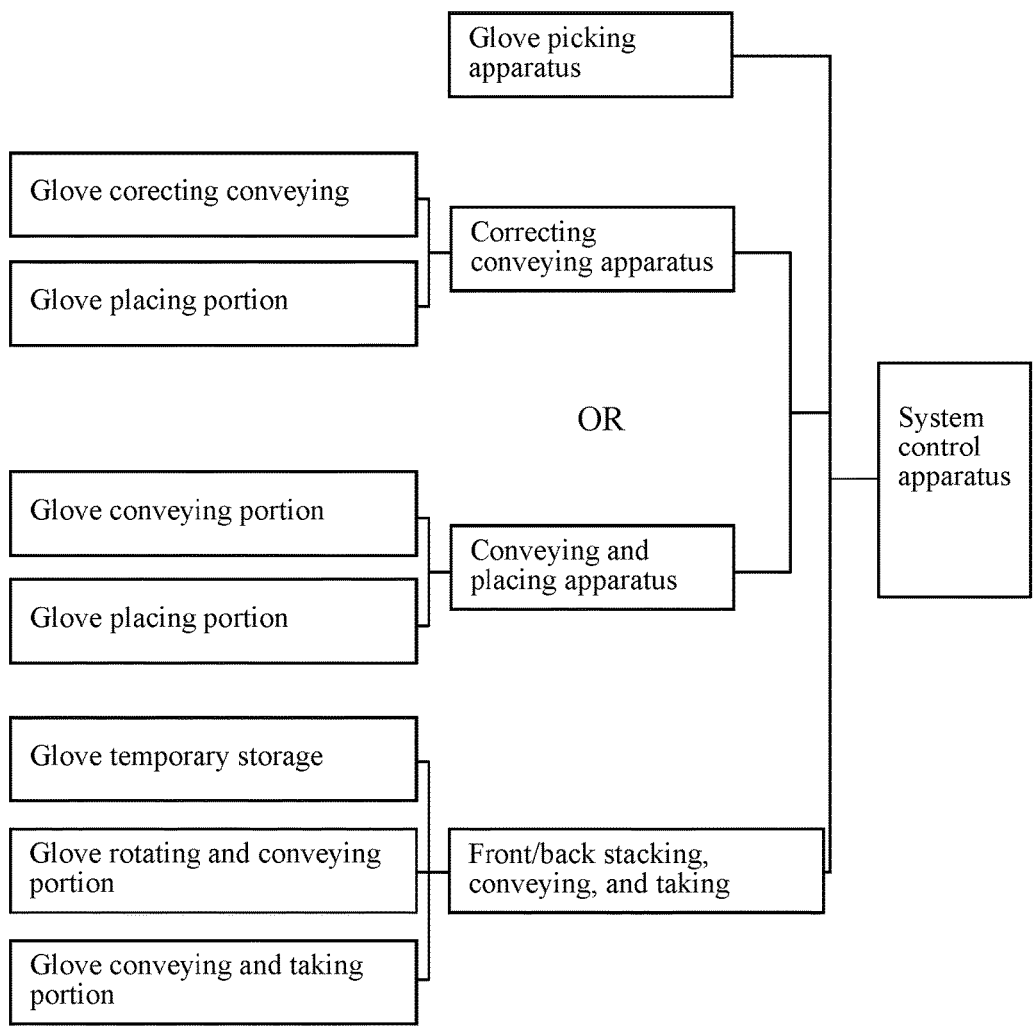
FIG. 1 is a structural schematic diagram of the present invention.

As shown in FIG. 1, the present invention comprises a glove-picking apparatus 2, a correcting conveying apparatus, a conveying and placing apparatus, and a front/back stacking, conveying, and taking apparatus; the glove-picking apparatus 2 is connected to the front/back stacking, conveying, and taking apparatus by means of the correcting conveying apparatus or the conveying and placing apparatus. A system control apparatus is connected to the described apparatuses and controls their switching and operation.

The conveying and placing apparatus comprises a glove conveying portion 7.

The correcting conveying apparatus comprises a glove correcting conveying portion 3.

The front/back stacking, conveying, and taking apparatus comprises a glove temporary storage portion 12, a glove receiving and conveying portion 13 and a glove conveying and taking portion 14.

The glove correcting conveying portion 3 is connected with the glove temporary storage portion 12 by means of the glove placing portion; the glove conveying portion 7 may be directly connected with the glove temporary storage portion 12, and also may be connected with the glove temporary storage portion 12 by means of the glove placing portion.

The present invention will be further described in details hereinafter with reference to the drawings and the specific embodiments.

Figure 2:
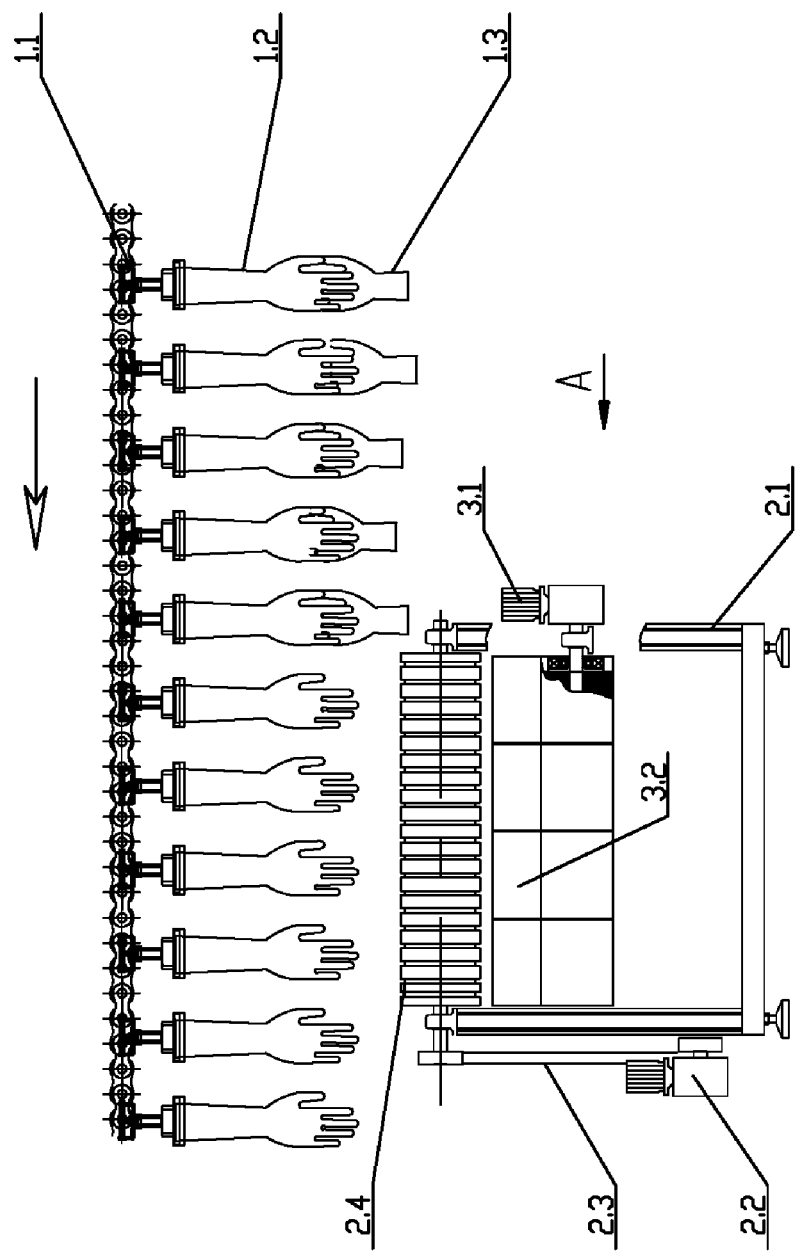
FIG. 2 is a structural schematic diagram of a glove picking apparatus and correcting and conveying apparatus (excluding glove moving and absorbing apparatus)

As shown in FIG. 2, the upper arrow is a motion direction of the glove production stream line. A lower portion of the glove production line 1.1 is suspended with a plurality of hand models 1.2. The gloves 1.3 are continuously produced by the hand model 1.2 by means of impregnation, material baking and other working procedures in a circulation running process, the glove 1.3 is semi-demolded from the hand model 1.2 after a semi-demolding procedure; however the glove wrist is uneven.

Figure 3:
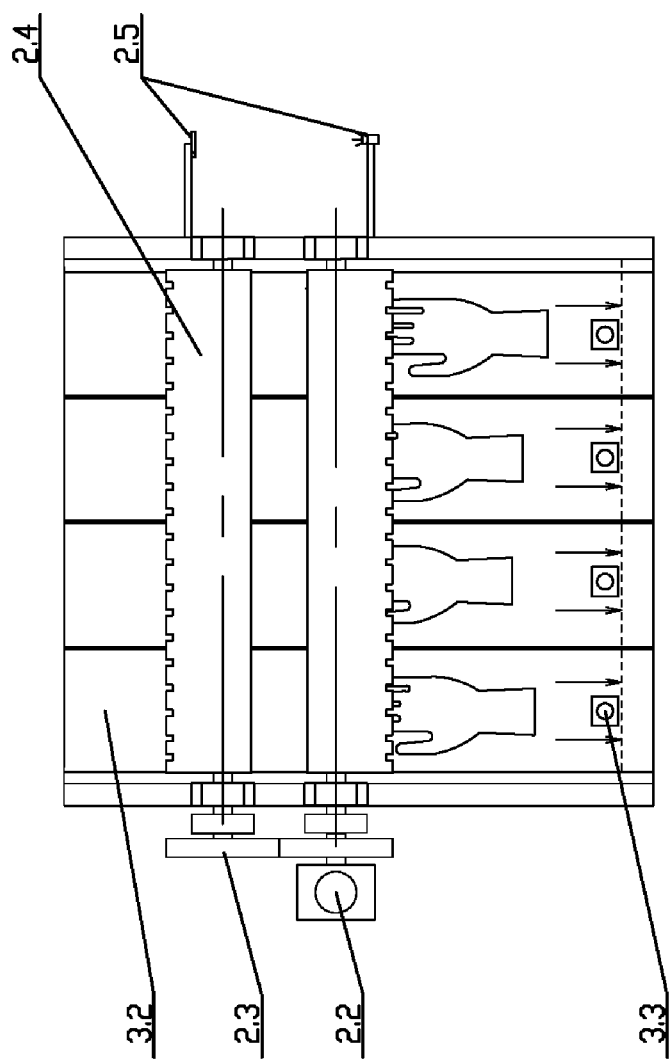
FIG. 3 is a top structural schematic diagram of the state that the position of the glove is not corrected (the arrow points to the moving direction of the glove, and the dotted line position pointed by the arrow is the finally stopping aligning position of the glove.

As shown in FIG. 2 and FIG. 3, the glove picking apparatus 2 comprises a set of picking rack 2.1, a picking motor 2.2, a set of picking power transmission group 2.3 (which may be in forms of transmission gears, driving belt or transmission chain, or the like), a pair of picking semi-rollers 2.4 and a set of glove detecting apparatus 2. The picking motor 2.2 drives the picking semi-roller 2.4 to internally rotate by means of the picking power transmission group 2.3. When two picking semi-rollers 2.4 are in a waiting position, a channel of the glove 1.3 is in the middle. When the glove detecting apparatus 2.5 detects that the passed number of the glove 1.3 (or the hand model 1.2) to be picked reaches the group number, it starts rotating to pick. The surfaces of the two picking semi-rollers 2.4 are closely adhered to each other. In order to exhaust, the surface of the picking semi-roller 2.4 is opened with an air-exhaust slot. In order to prevent static electricity from absorbing the glove, the surface is adhered with anti-static clothing. All the above described are mounted on the picking rack 2.1.

Embodiment 1

The glove picking apparatus 2 is connected with the front/back stacking, conveying, and taking apparatus by means of the correcting conveying apparatus.

As shown in FIG. 2 and FIG. 3, the correcting conveying apparatus described in the present invention comprises a glove correcting conveying portion 3. The glove correcting conveying portion 3 comprises a glove conveying mechanism and a glove position detecting mechanism 3.3; the glove conveying mechanism comprises a power conveying apparatus 3.1 and a conveyor belt 3.2, the power conveying apparatus 3.1 and the conveyor belt 3.2 compose a picking conveyor belt group; and the glove position detecting mechanism is connected to the system control apparatus, and the system control apparatus controls the operation of the power conveying apparatus 3.1. The glove position detecting mechanism 3.3 is mounted above the conveyor belt 3.2 for detecting whether or not the glove is in place, so as to control the power conveying apparatus 3.1, so that the glove wrist is on a line when the transmission belt 3.2 is stopped. All the above described are mounted on the picking rack 2.1. The glove position detecting mechanism 3.3 is component, such as a machine vision system, or a photoelectric sensor, or a vision sensor, which is capable of detecting the position of the glove, and is not limited to the embodiment.

Figure 4:
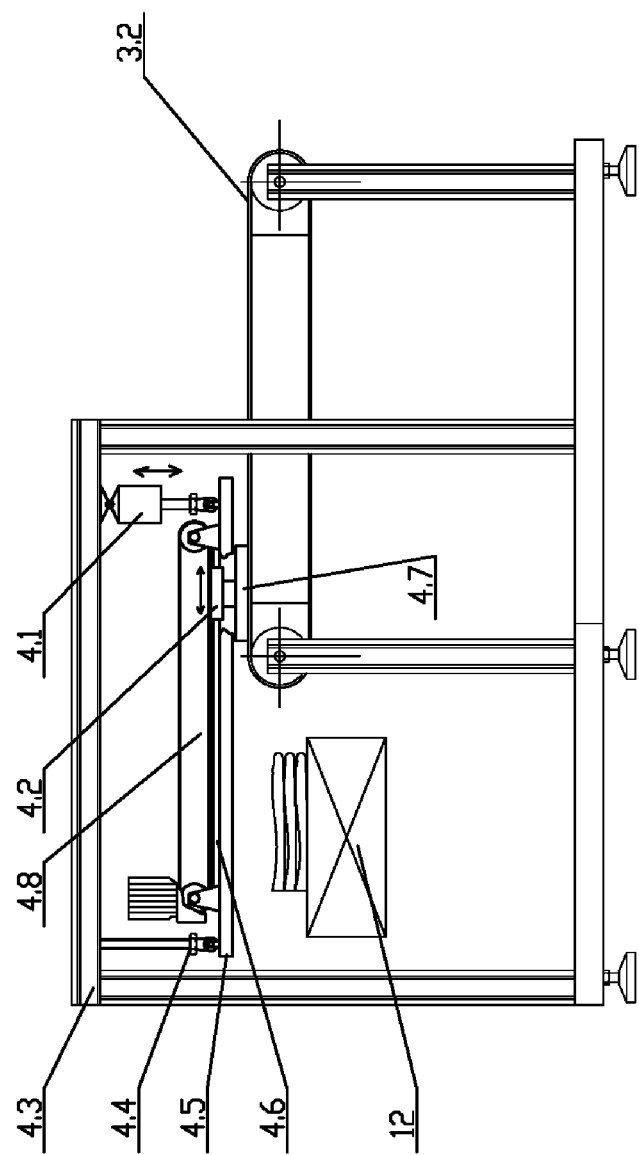
FIG. 4 is a schematic diagram of a matching structure of the glove moving and absorbing apparatus and the correcting and conveying apparatus of the present invention (the glove moving and absorbing apparatus is in a structure 1)

The correcting conveying further comprises a glove placing portion. The glove placing portion comprises a glove moving and absorbing apparatus, the glove moving and absorbing apparatus may absorb and transfer the gloves on the conveyor belt, and place the gloves on the glove temporary storage portion 12. As shown in FIG. 4, the glove moving and absorbing apparatus 4 (structure 1) comprises a frame 4.3, a lifting suspender 4.4, a power lifting apparatus 4.1 and a lifting frame 4.5, one end of the lifting frame 4.5 is hinged with one end of the frame 4.3 by means of the lifting suspender 4.4, and the other end of the lifting frame 4.5 is connected with the other end of the frame 4.3 by means of the power lifting apparatus 4.1. The power reciprocating apparatus 4.8 and the line guideway 4.6 are arranged on the lifting frame 4.5, a sliding block 4.2 is arranged on the line guideway 4.6, and the power reciprocating apparatus 4.8 drives the sliding block 4.2 to do reciprocating motion along the line guideway 4.6. The sliding block 4.2 is connected with the chuck 4.7. One end of the lifting frame 4.5 connected with the power lifting apparatus 4.1 faces towards the conveyor belt 3.2 of the glove conveying mechanism, and one of the lifting frame 4.5 connected with the lifting suspender 4.4 is engaged with the glove temporary storage portion 12. The chuck 4.7 may be in reciprocating motion along the line guideway 4.6. When the chuck 4.7 is located above the conveyor belt 3.2 and when the glove 1.3 is in place, the power lifting apparatus 4.1 enables the lifting frame 4.5 to drive the chuck 4.7 to move down, to absorb the glove on the conveyor belt 3.2, then the chuck 4.7 moves upward and moves along the line guideway 4.6 to the glove temporary storage portion 12, and the glove is loosened, to complete the first conveying process. The working process of the glove picking apparatus 2 and the correcting conveying apparatus is as follows:

As shown in FIG. 2 and FIG. 3, the semi-molded gloves 1.3 attached to the hand mold 1.2 are continuously conveyed by means of the glove production line 1.1. After the semi-demolding procedure of the glove 1.3, the glove wrist is uneven.

When the detecting apparatus 2.5 detects the glove 1.3 or the hand model passes through, a signal will be transmitted to the system control apparatus. The picking motor 2.2 starts running after the passing number reaches the set value. The picking motor 2.2 drives the picking power transmission group to move, thus driving the picking semi-roller 2.4 to internally rotate. When the surfaces of the two picking semi-rollers 2.4 are closely adhered to each other, one or more gloves 1.3 may be picked at a time. The picked gloves are fallen down on the conveyor belt 3.2 side by side, but the front-and-rear position is different.

As shown in FIG. 2, the power conveying apparatus 3.1 drives the conveying belt 3.2 to run. When the wrist of the glove 1.3 contacts the conveyor belt 3.2, the glove 1.3 is driven to tile on the conveyor belt 3.2 to convey forward.

As shown in FIG. 3, when any one of the four gloves 1.3 is conveyed to the lower portion of the glove position detecting mechanism 3.3, a signal is outputted from the glove position detecting mechanism 3.3 to the system control apparatus, the system control apparatus will power off or decelerate the corresponding power conveying apparatus 3.1, the conveyor belt 3.2 stops conveying or decelerates to convey, so that the glove 1.3 stops in a fixed position. As the several gloves are in position, the conveyor belt 3.2 stops conveying, and the wrists of the gloves 1.3 are in a line.

At this time, as shown in FIG. 4, the chuck 4.7 is located in the waiting position, the conveyor belt 3.2 stops conveying. When the chuck 4.7 is located above the conveyor belt 3.2, the power lifting apparatus 4.1 enables the lifting frame 4.5 to drive the chuck 4.7 to move downward, to absorb the gloves on the conveyor belt 3.2, then the chuck 4.7 moves upwards and along the line guideway 4.6 to the glove temporary storage portion 12, and the gloves are loosened. The chuck 4.7 looses the gloves and returns along the line guideway 4.6, and moves to the waiting position. The first conveying process is completed, and the next group of in-position signal is waited.

The power conveying apparatus 3.1 may be in a structure of conveying slowdown motor, an electromagnetic clutch and a conveyor belt driving roller. The power conveying apparatus may also be composed of an electric roller and a conveyor belt driven roller. The electric roller comprises an integrated electric roller with a motor internally disposed in the roller, and also comprises a molded type electric roller driving an unpowered roller to rotate by an external motor.

Figure 5:
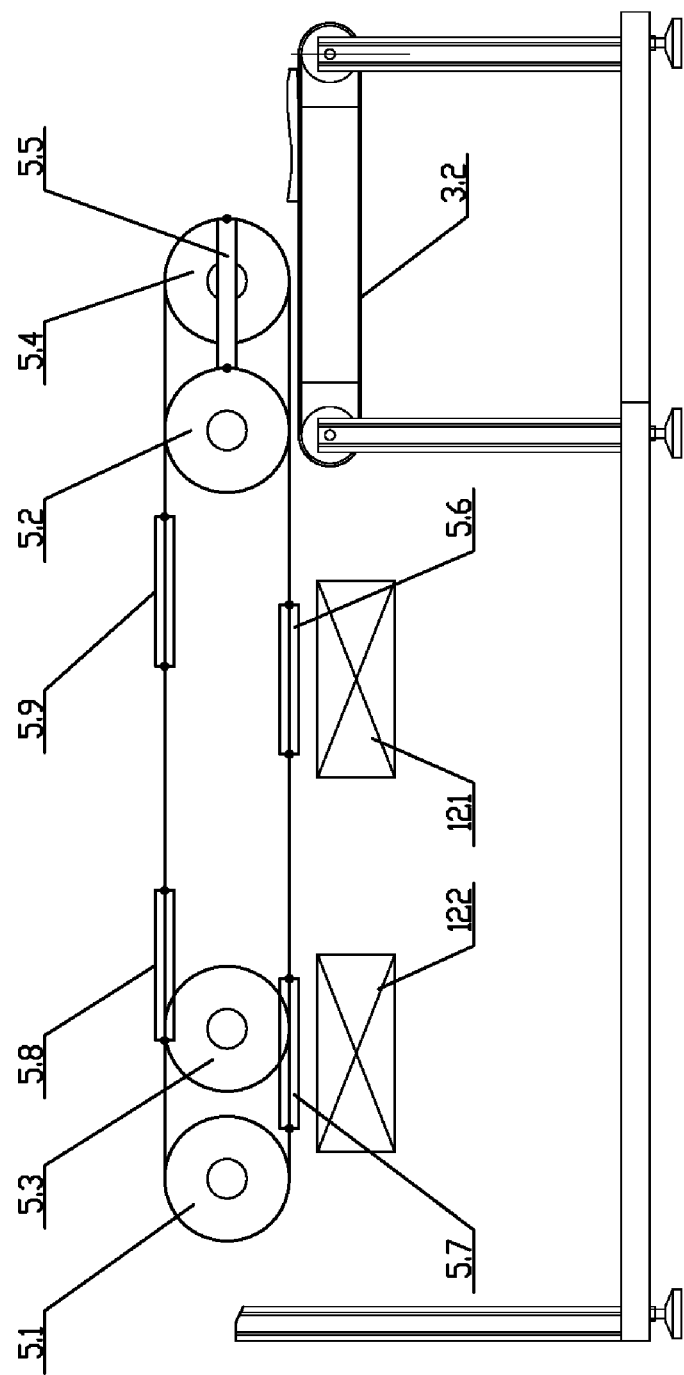
FIG. 5 is a schematic diagram of a matching structure of the glove moving and absorbing apparatus and the correcting and conveying apparatus of the present invention (the glove moving and absorbing apparatus is in a structure 2)

As shown in FIG. 5, the glove moving and absorbing apparatus may also be in the structure 2: the glove moving and absorbing apparatus 5 comprises a first transmission group and a second transmission group. The driving wheel 5.1 drives the driven 5.2 to rotate by means of a chain or a synchronous belt to form the first transmission group, and the driving wheel 5.3 drives the driven wheel 5.4 to rotate to form the second transmission group. The driving wheel 5.1 and the driving wheel 5.3 are driven by the same motor to rotate, ensuring the synchronous motion of the chain or the synchronous belt of the first and second transmission groups. It further comprises at least one chuck. The chuck is provided with two rotating shafts. The two rotating shafts are mounted on the first transmission group and the second transmission group respectively. The two transmission groups are arranged along the conveying direction of the glove, and there is a length of one chuck between the two transmission groups. When the motor drives the two transmission groups to rotates, the chain or the synchronous belt will synchronously run, so as to drive the chuck to be in the reciprocating motion in a circular way; moreover, the chuck is always in a way that the absorbing surface is arranged downward, and is not reversed due to the reciprocating motion. The line speed of the chain or the synchronous belt is the same as that of the conveyor belt 3.2, which is more convenient for the glove to synchronous convey.

Each chuck is mounted on two transmission groups in an equal distance. Each chuck may successfully pass by means of the waiting position and across the glove temporary storage portion 12, and absorb the glove from the conveyor belt 3.2, and release to the conveying operation of each temporary storage group of the glove temporary storage portion 12 respectively. As shown in FIG. 5, there are totally five chucks arranged in the figure, including the chuck 5.5, the chuck 5.6, the chuck 5.7, the chuck 5.8 and the chuck 5.9 respectively. When the chuck 5.5 is located in the waiting position of the glove on the conveyor belt 3.2, the chuck 5.6 is just located above the temporary storage group 12.1, and the chuck 5.7 is just located above the temporary storage group 12.2, the rest can be done in the same manner.

Figure 6:
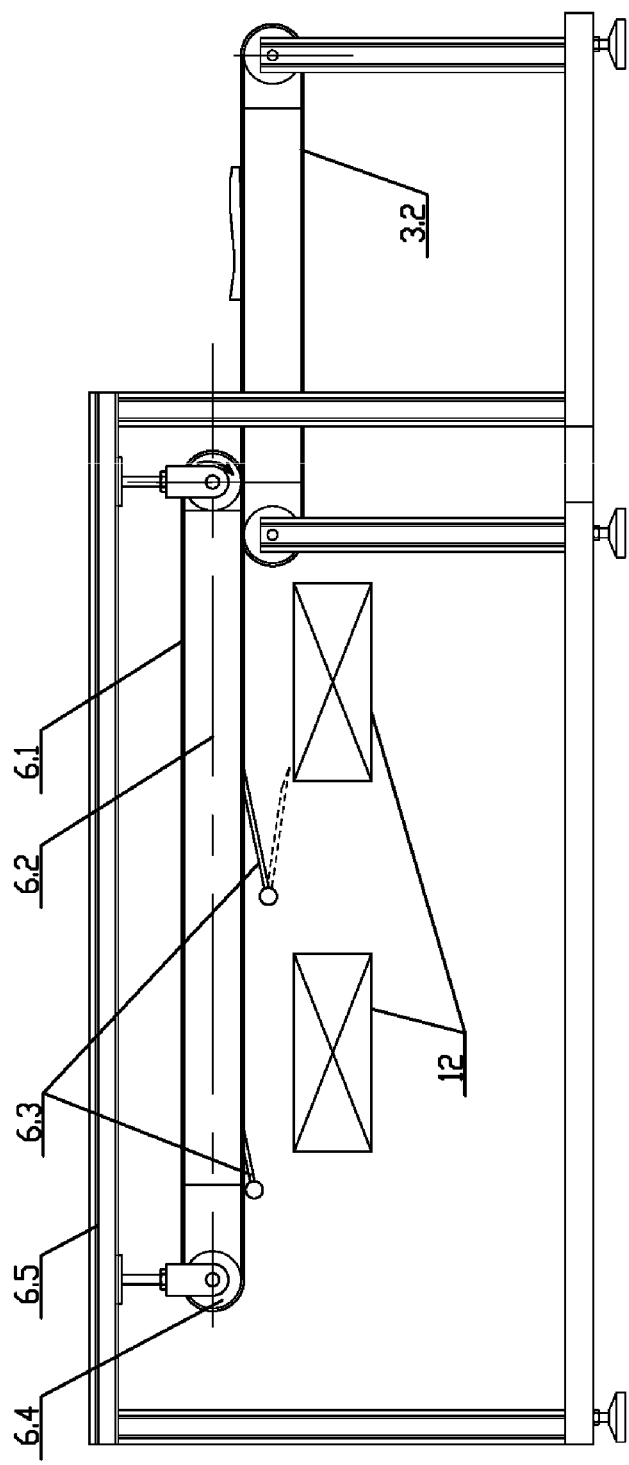
FIG. 6 is a schematic diagram of a matching structure of the glove moving and absorbing apparatus and the correcting and conveying apparatus of the present invention (the glove moving and absorbing apparatus is in a structure 3)

As shown in FIG. 6, the glove moving and absorbing apparatus may also be in the structure 3: the glove moving and absorbing apparatus 6 comprises a belt absorbing mechanism. The whole set of belt absorbing mechanism is mounted on the rack 6.5. The belt absorbing mechanism comprises a belt power roller 6.4, a belt with hole 6.1, a vacuum cavity 6.2 and a glove peeling board 6.3. The belt power roller 6.4 drives the belt with hole 6.1 to rotate. The vacuum cavity 6.2 is always connected with the vacuum system, so that the belt with hole 6.1 has an absorption action. The glove peeling board 6.3 is arranged below the belt with hole 6.1, and the glove peeling board 6.3 is tangent to the belt with hole 6.1.

When the conveyor belt 3.2 is in the conveying process, the system control apparatus controls the belt with hole 6.1 to absorb the glove, the belt power roller 6.4 drives the belt with hole 6.1 to rotate. As the belt with hole 6.1 is always connected with the vacuum cavity 6.2, the belt with hole 6.1 is always absorbed with the glove 1.3. Only when the glove 1.3 is scooped up by the glove peeling board 6.3 to separate from the vacuum cavity 6.2, the belt with hole 6.1 losses the absorbing force, and the glove 1.3 is naturally dropped down on the glove temporary storage portion 12.

The front/back stacking, conveying, and taking apparatus described in the present invention comprises a glove temporary storage portion 12, a glove receiving and conveying portion 13 and a glove conveying and taking portion 14. The system control apparatus comprises a sense counter. The system control apparatus is connected to the glove temporary storage portion 12, the glove receiving and conveying portion 13 and the glove conveying and taking portion 14, and controls various specific actions and the matching operation among the mechanisms.

Figure 7:
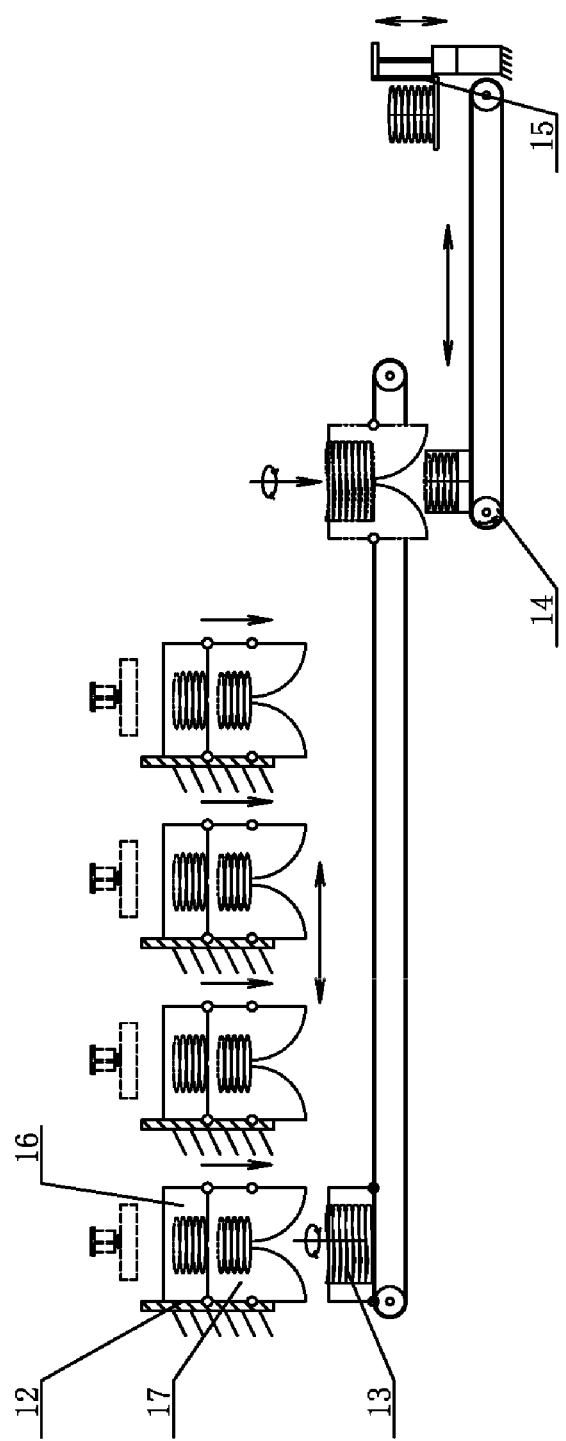
FIG. 7 is a schematic structural diagram of a front/back stacking, conveying, and taking apparatus.

As shown in FIG. 7, the glove temporary storage portion 12 comprises four temporary storage groups, and the number of the temporary storage groups shall be set to be the same as that of the glove absorbing and releasing apparatus in the picking and stacking equipment. Each temporary storage group comprises two longitudinally arranged transition case bins 16 and 17, an upper end of the transition case bin is opened, and a lower portion of the transition case is provided with a bin gate capable of automatically opening and closing. When there are many group numbers of the chucks 11, not only the group number of the temporary storage groups shall be correspondingly increased, but also the number of the transition case bin shall be appropriately increased, so that the whole set of system may also be satisfied with the increased temporary storage requirements to adapt to the faster production speed when the rotation case bin 20 is operated on the longer production line.

Figure 8:
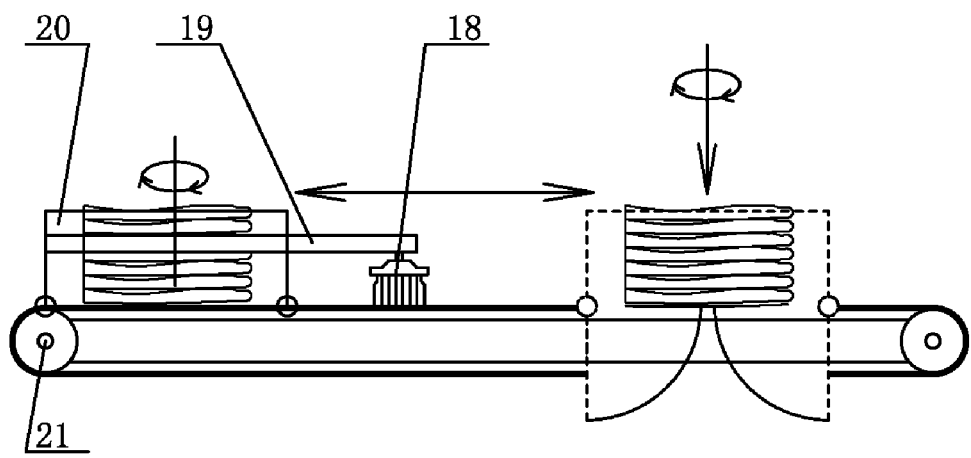
FIG. 8 is a schematic structural diagram of a glove receiving and conveying portion.
Figure 9:
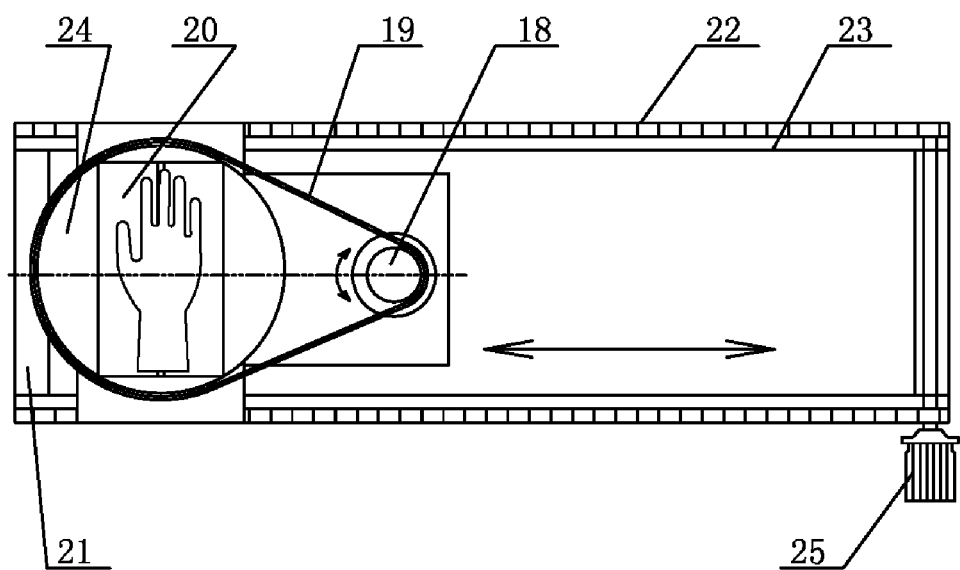
FIG. 9 is a top view of FIG. 8.

As shown in FIG. 7, the glove receiving and transporting portion 13 is arranged below the glove temporary storage portion 12. As shown in FIG. 8 and FIG. 9, the glove receiving and conveying portion 13 comprises a rotating case bin 20, the rotating case bin 20 is mounted on a first moving apparatus, and the rotating apparatus is arranged on the first moving apparatus 21. An upper end of the rotating case bin 20 is opened, and a lower portion of the rotating case bin 20 is provided with a bin gate capable of automatically opening and closing. The rotating apparatus comprises a case bin turntable 24, a rotating power transmission group, a rotating motor 18 and a mounting rack; the rotating case bin 20 is mounted on the case bin turntable 24, the case bin turntable 24 is provided with a feeding port, the bin gate of the rotating case bin 20 may be opened in the feeding port; the case bin turntable 24 is arranged on the mounting rack and may freely rotate on the mounting rack; and the rotating motor 18 drives the case bin turntable 24 and the rotating case bin to rotate via the rotating power transmission group. In this embodiment, the rotating power transmission group is driven by the belt, and may also be selected from the synchronous belt, the chain or the gear engagement or other structures, and is not limited to this embodiment.

Figure 13:
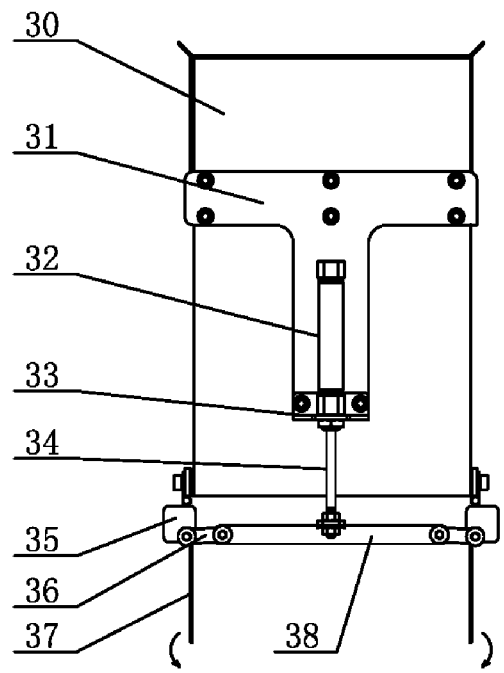
FIG. 13 is a schematic structural diagram of a transition case bin or a rotating case bin in embodiment 1 (bin gate opening state)
Figure 14:
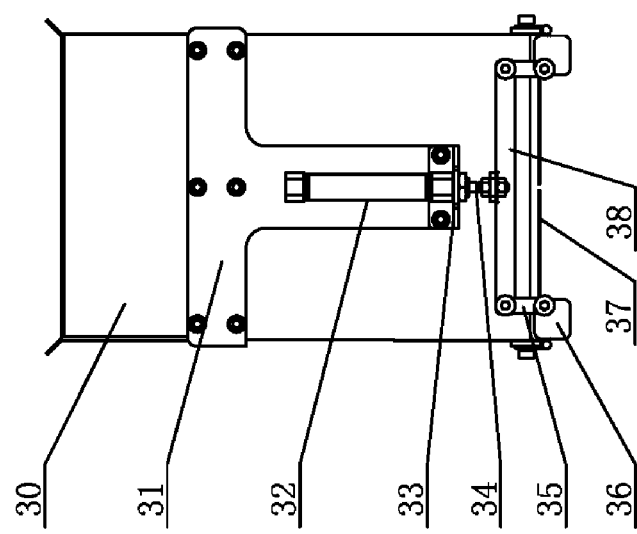
FIG. 14 is a schematic structural diagram of a transition case bin or a rotating case bin in embodiment 1 (bin gate closing state)

As shown in FIG. 13 and FIG. 14, in this embodiment, the structure of the transition case bin is basically the same as that of the rotating case bin 20. It comprises a bin body 30, and the bin gate 37 capable of automatically opening oppositely may be arranged below the bin body 30 by means of the bin gate opening-closing mechanism. The bin gate opening and closing mechanism comprises a power opening-closing mechanism, and an opening-closing cylinder 32 is adopted for the power opening-closing mechanism in this embodiment. The power opening-closing mechanism further comprises a case bin fixing board 31, a cylinder support 33, a bin gate hinge 35, a connecting rod and a beam 38. The opening-closing cylinder 32 is mounted on the bin body 30 by means of the case bin fixing board 31 and the cylinder support 33, the telescopic shaft 34 of the opening-closing cylinder 32 is connected with the beam 38, both ends of the beam 38 are jointed and connected with one connecting rod 36 respectively, the other end of the connecting rod 36 is hinged with the bin gate hinge 35, the bin gate 37 is mounted at the lower portion of the bin body 30 by means of the bin gate hinge 35; when the number of the gloves in the bin body 30 reaches the group number, the system control apparatus enables the opening-closing cylinder 32 to push out and withdraw, thereby driving the beam 38 and the connecting rod 36 to move. The connecting rod 36 drives the bin gate to rotate the rotating shaft of the bin gate hinge 35, thereby realizing the automatically opening and closing of the bin gate 37.

Figure 10:
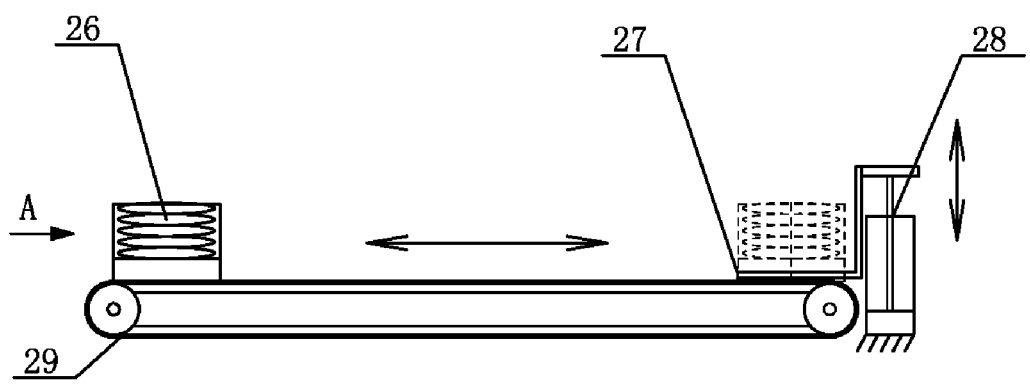
FIG. 10 is a schematic structural diagram of a glove transporting and taking portion.
Figure 11:
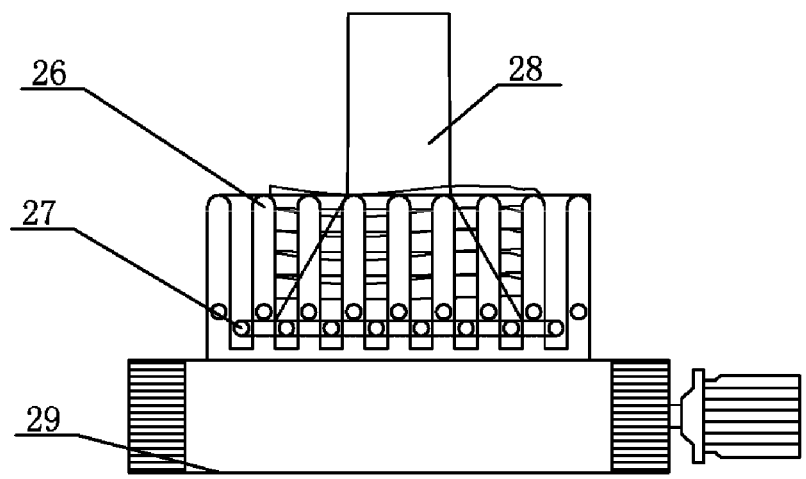
FIG. 11 is a structural schematic diagram of an A-direction of FIG. 10.

As shown in FIG. 10 and FIG. 11, the glove conveying and taking portion 14 comprises a transfer case bin 26, a second moving apparatus 29 and a glove taking apparatus 15, the transfer case bin 26 is mounted on the second moving apparatus 29; a front end of the second moving apparatus 29 is located at a lower portion of the first moving apparatus 21, which is able to receive the gloves fallen from the rotating case bin 20 when the transfer case bin 26 is located at the front end of the second moving apparatus 29. An end of the second moving apparatus 29 is provided with the glove taking apparatus 15, and the glove taking apparatus 15 may take out the stacked gloves in the transfer case bin 26.

Figure 12:
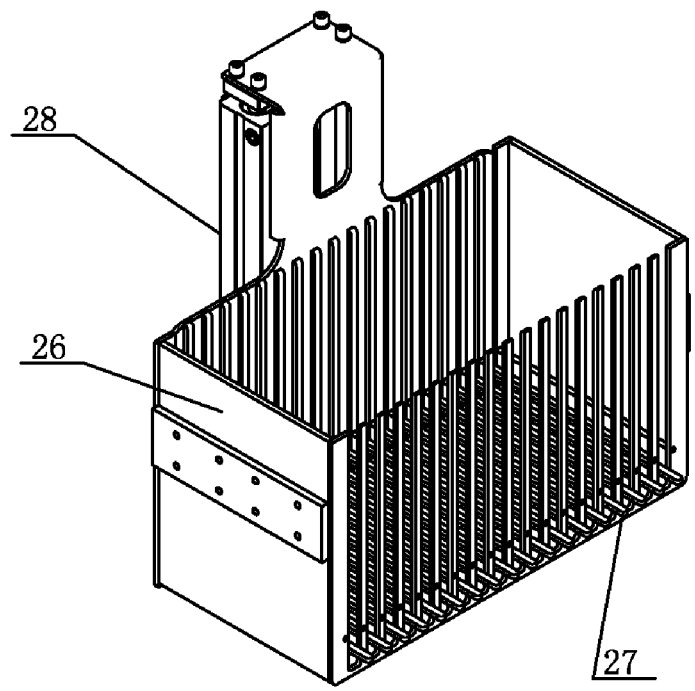
FIG. 12 is a schematic diagram of a matching structure of a transfer case bin and the glove taking apparatus (a taking claw is inserted into the transfer case bin)

As shown in FIG. 12, a bottom board and front and rear side walls of the transfer case bin 26 are strip-like grating. The glove taking apparatus 15 comprises a taking power unit 28 and a taking claw 27, the taking claw 27 is in a shape of fish fork, and the taking power unit 28 may drive the taking claw 27 to move up and down. When the transfer case bin 26 is located at a front end of the second moving apparatus 29, the taking power unit 28 drives the taking claw 27 to locate at a lower portion, when the transfer case bin 26 is located at an end of the second moving apparatus 29, the taking claw 27 is inserted in the lower portion of the bottom board of the transfer case bin 26, the taking power unit 28 may drive the taking claw 27 to move upward and pass by means of a grating clearance between the bottom board and the side wall of the transfer case bin 26, to take the glove out. The glove taking apparatus 15 may make sufficient time for the next step of boxing, and may also move upward to the best position to adapt to box for worker.

The first or second moving apparatus comprises a machine frame 23, both front end and rear end of the machine frame 23 are provided with a transmission roller respectively, the transmission roller is sleeved with the conveyor belt 22, the mounting rack is fixed on the conveyor belt 22; one of the transmission roller is connected with the moving motor 25; and the opening and closing operations of the bin gate do not intervene with the conveyor belt 22.

The front/back stacking operation of the glove comprises the following steps:

a. stacking: the glove temporary storage portion 12 is provided with S temporary storage groups, S □1. The gloves are stacked in the transition case bin 16 at the uppermost layer of each temporary storage group. When the chuck 11 absorbs the gloves in a vacuum manner to the above position of the transition case bin 16, the chuck 11 cuts off the vacuum, and the gloves are dropped down by their own weight. The chuck 11 reciprocates back and forth, and when the sense counter detects that the number of gloves in the transition case bin 16 reaches the preset number, the system control apparatus controls the bin gate of the transition case bin 16 to open, and the gloves are fallen into the lower layer of transition case bin 17 step by step.

b. Rotating and Conveying:

When the rotating case bin is located below one temporary storage group, the bin gate of the transition case bin at the lowest layer of the temporary storage group is opened, the gloves are fallen into the rotating case bin; the rotating case bin places the gloves into the transfer case bin after regulating the gloves backward by means of rotation. Among them, the rotation angle of the rotating case bin regulating the direction of the glove is N°, and the action times of the rotating case bin receiving the gloves from the transition case bin is n.

In this embodiment, when the first moving apparatus and the second moving apparatus are arranged in the same direction, $N=[(-1)(n+1)+1]90$, the n is the action times of the rotating case bin receiving the gloves from the transition case bin, that is, $N=\{180, 0, 180, 0, 180 \ldots\}$ In this step, two different modes of operation can be used as needed:

Mode 1: after the gloves are stacked front and back in the rotating case bin 20 to meet the requirements of boxing at a time, and then the several stacks of gloves are transferred to the transfer case bin 26 at one time. The specific operation is as follows: when the rotating case bin 20 is located below the first temporary storage group, the bin gate of the transition case bin 17 at the lowest layer of the temporary storage group is opened, and the gloves are fallen into the rotating case bin 20; after the rotating case bin 20 rotates 180°, it moves below the second temporary storage group, the bin gate of the transition case bin 17 at the lowest layer of the temporary storage group is opened, and the gloves are fallen into the rotating case bin 20; after the rotating case bin 20 rotates 180°, it moves below the third temporary storage group, . . . , the bin gate of the transition case bin 17 at the lowest layer of the temporary storage group S is opened, and the gloves are fallen into the rotating case bin 20. At this time, the stack number of the gloves stacked front and back in the rotating case bin 20 has met the requirement for boxing, the rotating case bin 20 moves to the end of the first moving apparatus 21, the system control apparatus controls the bin gate of the rotating case bin 20 to open and the gloves are fallen into the transfer case bin 26 below.

Mode 2: when receiving each small stack of gloves, the rotating case bin 20 corrects the direction of the gloves, and then sends to the transfer case bin 26 immediately, until the stack number of the gloves stacked front and back in the transfer case bin 26 meets the requirements of boxing at a time. The specific operation is as follows: when the rotating case bin 20 is located below the first temporary storage group, the bin gate of the transition case bin 17 at the lowest layer of the temporary storage group is opened, and the gloves are fallen into the rotating case bin 20; the rotating case bin 20 conveys one of the small stack of gloves to the end of the first moving apparatus 21, the system control apparatus controls the bin gate of the rotating case bin 20 to open, the gloves are fallen into the transfer case bin 26; the rotating case bin 20 moves below the second temporary storage group, the bin gate of the transition case bin 17 at the lowest layer of the temporary storage group is opened, the gloves are fallen into the rotating case bin 20, the rotating case bin 20 conveys one of the small stack of gloves to the end of the first moving apparatus 21, after the rotating case bin 20 rotates 180°, the system control apparatus controls the bin gate of the rotating case bin 20 to open, the gloves are fallen into the transfer case bin 26; this is repeated until the stack number of the accumulated gloves stacked front and back in the transfer case bin 26 meets the requirement of boxing at one time.

c. Transferring and Taking:

The transfer case bin 26 is moved from the front end of the second moving apparatus 29 to the end when the transfer case bin 26 is stacked to the desired number of gloves, and the taking claw 27 is inserted under the bottom board of the transfer case bin 26, and the taking power unit 28 drives the taking claw 27 to move up and pass by means of the grating clearance between the bottom board and the side wall of the transfer case bin 26, to take the glove and raise to the best position suitable for the boxing operation.

When the first moving apparatus and the second moving apparatus are arranged perpendicular to each other, N=(−1) n×90, i.e., N={90, −90, 90, −90 . . . }. At this time, the step b of the production technology of the glove picking, organizing, and stacking apparatus may also use the following modes of operation:

When the rotating case bin 20 is located below the first temporary storage group, the bin gate of the transition case bin 17 at the lowest layer of the temporary storage group is opened, and the gloves are fallen into the rotating case bin 20; the rotating case bin 20 conveys one of the small stack of gloves to the end of the first moving apparatus 21, the system control apparatus controls the rotating case bin 20 to rotate 90° clockwise, then the bin gate of the rotating case bin 20 is opened, the gloves are fallen into the transfer case bin 26, and the rotating case bin 20 continuous to rotate 90° clockwise; the rotating case bin 20 moves below the second temporary storage group, the bin gate of the transition case bin 17 at the lowest layer of the temporary storage group is opened, the gloves are fallen into the rotating case bin 20, the rotating case bin 20 conveys one of the small stack of gloves to the end of the first moving apparatus 21, the system control apparatus controls the rotating case bin 20 to rotate 90° counterclockwise, the system control apparatus controls the bin gate of the rotating case bin 20 to open, the gloves are fallen into the transfer case bin 26, then the rotating case bin 20 continue to rotate 90° counterclockwise; this is repeated until the stack number of the accumulated gloves stacked front and back in the transfer case bin 26 meets the requirement of boxing at one time.

If the manufacturer does not need gloves to be staggered, the glove receiving and conveying portion 13 may also not be provided with a rotating apparatus, the rotating case bin 20 is mounted directly on the first moving apparatus 21, and reciprocates linearly along the first moving apparatus 21. Or the glove receiving and conveying portion 13 is not mounted, the glove temporary storage portion 12 may also be directly engaged with the glove conveying and taking portion 14.

Embodiment 2

In this embodiment, the temporary storage group of the glove temporary storage portion is the overlapping and stacking apparatus 8.

Figure 15:
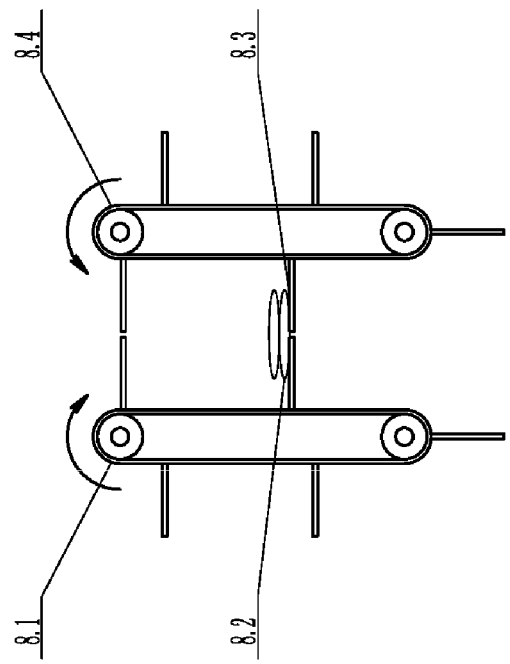
FIG. 15 is a schematic structural diagram of an overlapping and stacking apparatus in embodiment 2.

As shown in FIG. 15, the overlapping and stacking apparatus 8 comprises two groups of vertically arranged closed type endless conveyor belts 8.1 and 8.4, and a power mechanism, and the power mechanism drives adjacent side faces of the two endless conveyor belts to convey downward in a synchronous manner. The endless conveyor belt is fixed with a plurality of supporting boards. The supporting boards 8.2 and 8.3 at both sides driven by the endless conveyor belt 8.1 and 8.4 may be abutted between the two endless conveyor belts, to form a downward moving temporary glove supporting platform at the same time. Each temporary glove supporting platform and a storing space thereabove form a transition case bin. The power mechanism is a stepping motor or a seed regulating motor, which may realize the intermittent moving down or slowing down of the temporary glove support platform on the endless conveyor belt, to match with the overlapping operation of the glove.

The overlapping stacking device 8 may completely replace the temporary storage group in the opening-closing case bin structure in the embodiment 1.

The remaining structures and operation modes are the same as those of the embodiment 1 and will not be described again.

Embodiment 3

In this embodiment, the conveying and placing apparatus may be used instead of the correcting conveying apparatus. The glove picking apparatus 2 is connected with the front/back stacking, conveying, and taking apparatus by means of the conveying and placing apparatus.

Figure 16:
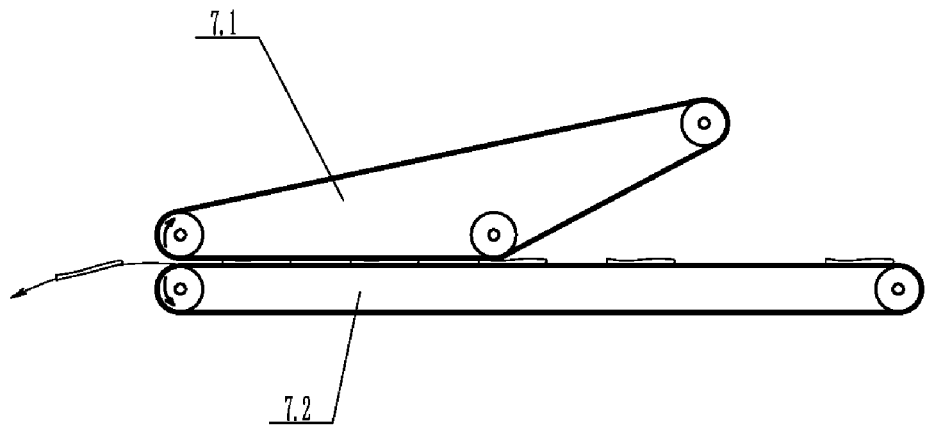
FIG. 16 is a schematic structural diagram of the glove conveying portion in embodiment 3.

As shown in FIG. 16, the glove conveying portion 7 of the conveying and placing apparatus described in the present invention comprises an upper conveyor belt 7.1 and a lower conveyor belt 7.2, and a glove clamping and conveying space is formed between the upper and lower conveyor belts. The upper and lower conveyor belts clamp and convey the glove along the same direction. The glove conveying portion 7 may clamp and convey and place the glove on the glove temporary storage portion by means of movement inertia.

A plurality of exhaust raised lines are arranged on the upper conveyor belt 7.2 and/or the lower conveyor belt 7.2, and the exhaust raised line are arranged in parallel along the conveying direction of the upper and lower conveyor belts. The cross section of the exhaust raised line is square or circular. Or, the upper conveyor belt or the lower conveyor belt comprises a plurality of branch conveyor belts parallel to each other, and there is a gap between the branch conveyor belts. The cross section of the branch conveyor belt is square or circular.

This apparatus conveys the gloves by means of the clamping and conveying space between the upper and lower conveyor belts, the gloves are thrown out from the clamping and conveying space after movement inertia, and directly fallen to the glove temporary storage portion 12. The glove conveying portion 7 may be engaged with only one glove picking apparatus 2, but conveys a row of gloves; the upper and lower conveyor belts may also be widened to convey several rows of gloves at the same time. Because point-to-point one-time conveyance in place is achieved by this apparatus, no alignment apparatus is needed to assist to place or overlap and stack the gloves regularly. The exhaust raised lines and branch conveyor belt can play a role or pre-pressing and exhausting the gloves in the conveying process, and are more conducive to the overlapping and packaging operations at the next step.

The structure and the operation mode of the glove picking apparatus 2, the front/back stacking, conveying, and taking apparatus and the glove temporary storage portion and other equipment are the same as those of the first or second embodiment, and will not be described again.

Embodiment 4

Figure 17:
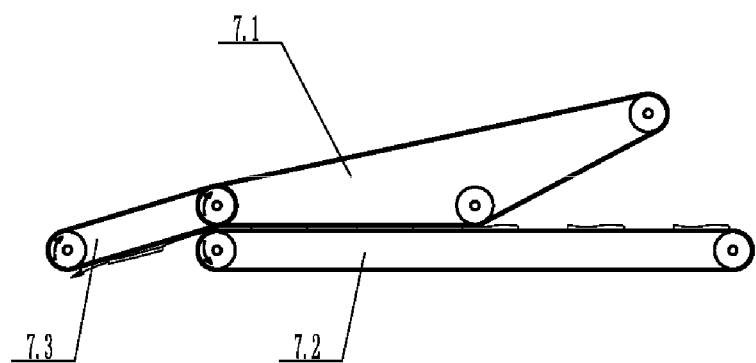
FIG. 17 is a schematic structural diagram of the glove conveying portion with a down-pressing type steering conveyor belt in embodiment 4.

As shown in FIG. 17, on the basis of the embodiment 3, the glove conveying portion further comprises a down-pressing type steering conveyor belt 7.3. An upper end of the down-pressing type steering conveyor belt 7.3 and the end of the upper conveyor belt 7.1 are engaged or coaxially mounted with each other, and a lower end of the down-pressing type steering conveyor belt 7.3 points to the glove temporary storage portion 12.

The gloves which are thrown out from the upper and lower conveyor belts are able to reach the preset position by the guide action of the down-pressing type steering conveyor belt 7.3; in addition, and the synchronous or differential conveyance of the down-pressing type steering conveyor belt 7.3 can also play a role of assisting and damping.

The remaining structures and operation modes are the same as those of the embodiment 2 or 3 and will not be described again.

Embodiment 5

Figure 18:
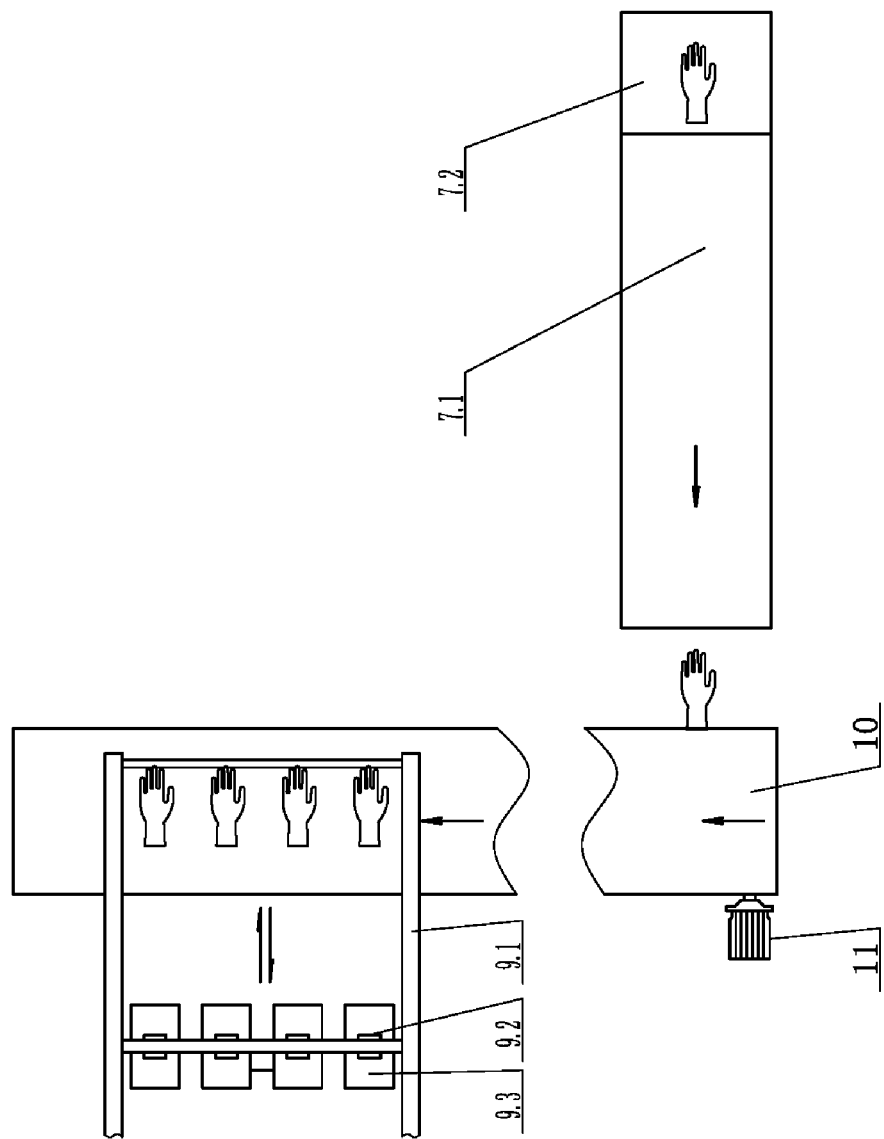
FIG. 18 is a schematic structural diagram that the conveying and placing apparatus is connected with the glove temporary storage portion via the glove placing portion in embodiment 5 (the glove moving and absorbing apparatus is in a structure 4).

As shown in FIG. 18, on the basis of the embodiment 3 or 4, the conveying and placing apparatus further comprises a glove placing portion, and is engaged with the front/back stacking, conveying, and taking apparatus by means of the glove placing portion. The glove placing portion comprises a tiling and placing conveyor belt 10, a power mechanism 11 and a glove moving and absorbing apparatus. In this embodiment, the power mechanism 11 is connected to and drives the tiling and placing conveyor belt 10 to convey. The power mechanism 11 is a stepping motor or a speed regulating motor, which may realize the intermittent motion or slow motion of the tiling and placing conveyor belt 10, so that the gloves are configured at equal interval on the tiling and placing conveyor belt 10, which is convenient for the absorbing and transferring operations at the next step. The glove moving and absorbing apparatus 9 comprises at least one chuck 9.3, the chuck 9.3 may be mounted on the reciprocating guideway 9.1, or the chuck 9.3 is mounted on the reciprocating guideway 9.1, and the lifting cylinder 9.2 is mounted on the reciprocating guideway to lift the chuck group at the same time. The chuck 9.3 may lift, absorb and transfer the gloves on the tiling and placing conveyor belt 10 in a reciprocating manner and place the gloves in the glove temporary storage portion 12.

In this embodiment, the glove moving and absorbing apparatus 9 is in the structure 4 shown in FIG. 18, but is not limited to this embodiment, and the glove moving and absorbing apparatus may also be in the form of the structures 1 to 3 in the foregoing embodiment (only if the conveyor belt 3.2 in FIG. 4 to FIG. 6 is replaced with the tiling and placing conveyor belt 10), the job requirements can be realized. Appropriate options can be made as needed. The remaining structures and operation modes are the same as those of the foregoing embodiments and will not be described again.

The foregoing is intended to be the preferred embodiments of the present invention and is not intended to limit the other forms of the present invention, and any person skilled in the art may use the technical contents disclosed above to be modified or remodeled to be equivalent embodiments. Whereas any simple modification, equivalent variation and remodeling to the above embodiments in accordance with the technical substance, without departing from the contents of the technical solution of the present invention, will be fallen within the protection scope of the technical solution of the present invention.

What is claimed is:

1. A glove picking, organizing, and stacking apparatus, comprising a system control apparatus and a front/back stacking, conveying, and taking apparatus; wherein the system control apparatus comprises a sense counter; the system control apparatus is connected to and controls the front/back stacking, conveying, and taking apparatus; the front/back stacking, conveying, and taking apparatus comprises a glove temporary storage portion, the glove temporary storage portion is engaged with a glove receiving and conveying portion and/or a glove conveying and taking portion;

the glove temporary storage portion comprises at least a temporary storage group, each temporary storage group comprises at least a longitudinally arranged transition case bin, an upper end of the transition case bin is opened, and a lower portion of the transition case is provided with a bin gate capable of automatically opening and closing; and the glove receiving and conveying portion is arranged below the glove temporary storage portion; the glove receiving and conveying portion comprises a rotating case bin, the rotating case bin is mounted on a first moving apparatus; an upper end of the rotating case bin is opened, and a lower portion of the rotating case bin is provided with a bin gate capable of automatically opening and closing.

2. The glove picking, organizing, and stacking apparatus according to claim 1, wherein the glove receiving and conveying portion further comprises a rotating apparatus, the rotating apparatus comprises a case bin turntable, a rotating power transmission group, a rotating motor and a mounting rack; the rotating case bin is mounted on the case bin turntable, the case bin turntable is provided with a feeding port, the bin gate of the rotating case bin may be opened in the feeding port; the case bin turntable is arranged on the mounting rack and may freely rotate on the mounting rack; and the rotating motor drives the case bin turntable and the rotating case bin to rotate via the rotating power transmission group.

3. The glove picking, organizing, and stacking apparatus according to claim 1, wherein the transition case bin or the rotating case bin comprises a bin body, the bin body is provided with a bin gate opening and closing mechanism; the bin gate opening and closing mechanism comprises an opening and closing power mechanism, a bin gate hinge, a connecting rod and a beam; the opening and closing power mechanism is mounted on the bin body, a telescopic shaft of the opening and closing power mechanism is connected with the beam, the beam is hinged with the connecting rod, the other end of the connecting rod is hinged with the bin gate hinge, the bin gate is mounted at a lower portion of the bin body via the bin gate hinge; the system control apparatus may control the telescopic shaft of the opening and closing power mechanism to push out and withdraw, thereby driving the beam and the connecting rod to move, and the connecting rod drives the bin gate to rotate along a spindle of the bin gate hinge, so as to achieve the automatically opening and closing of the bin gate.

4. The glove picking, organizing, and stacking apparatus according to claim 1, wherein the temporary storage group is an overlapping and stacking apparatus, the overlapping and stacking apparatus comprises a power mechanism and two groups of vertically arranged closed type endless conveyor belts, the power mechanism drives adjacent side faces of the two endless conveyor belts to convey downward in a synchronous manner; the endless conveyor belt is fixed with a plurality of supporting boards; the supporting boards at both sides driven by the endless conveyor belt may be abutted between the two endless conveyor belts, to form a downward moving temporary glove supporting platform; and each temporary glove supporting platform and a storing space there above form a transition case bin.

5. The glove picking, organizing, and stacking apparatus according to claim 1, wherein the glove conveying and taking portion comprises a transfer case bin, a second moving apparatus and a glove taking apparatus, the transfer case bin is mounted on the second moving apparatus; a front end of the second moving apparatus is located at a lower portion of the first moving apparatus; an end of the second moving apparatus is provided with the glove taking apparatus, the glove taking apparatus may take out stacked gloves in the transfer case bin.

6. The glove picking, organizing, and stacking apparatus according to claim 5, wherein a bottom board and at least one side wall of the transfer case bin are strip-like grating; the glove taking apparatus comprises a taking power unit and a taking claw, the taking claw is in a shape of fish fork, the taking power unit may drive the taking claw to move up and down; when the transfer case bin is located at a front end of the second moving apparatus, the taking power unit drives the taking claw to locate at a lower portion, when the transfer case bin is located at an end of the second moving apparatus, the taking claw is inserted in the lower portion of the bottom board, the taking power unit may drive the taking claw to move upward and pass by means of a grating clearance between the bottom board and the side wall of the transfer case bin, to take the glove out.

7. The glove picking, organizing, and stacking apparatus according to claim 1, further comprising a conveying and placing apparatus, wherein the system control apparatus is connected to and controls the conveying and placing apparatus, the conveying and placing apparatus comprises a glove conveying portion, the glove conveying portion comprises an upper conveyor belt and a lower conveyor belt, a glove clamping and conveying space is formed between the upper and lower conveyor belts, the upper and lower conveyor belts clamp and convey the glove along a same direction; the glove conveying portion is abutted with the glove temporary storage portion, and the glove conveying portion may clamp and convey and place the glove on the glove temporary storage portion by means of movement inertia.

8. The glove picking, organizing, and stacking apparatus according to claim 7, wherein the glove conveying portion further comprises a down-pressing type steering conveyor belt, an upper end of the down-pressing type steering conveyor belt and the end of the upper conveyor belt are engaged or coaxially mounted with each other, and a lower end of the down-pressing type steering conveyor belt points to an anticipated placing position of the glove.

9. The glove picking, organizing, and stacking apparatus according to claim 7, further comprising a glove placing portion, wherein a correcting conveying apparatus or the glove conveying portion are engaged with the glove temporary storage portion via the glove placing portion;

when the correcting conveying apparatus is engaged with the glove temporary storage portion via the glove placing portion, the glove placing portion comprises a glove moving and absorbing apparatus, the glove moving and absorbing apparatus may absorb and transfer the gloves on the conveyor belt of the glove conveying mechanism, and place the gloves in the glove temporary storage portion;

when the glove conveying portion is engaged with the glove temporary storage portion via the glove placing portion, the glove placing portion comprises a tiling and placing conveyor belt and a glove moving and absorbing apparatus; the glove conveying portion conveys the gloves on the tiling and placing conveyor belt, the glove moving and absorbing apparatus may absorb and transfer the gloves on the tiling and placing conveyor belt, and place the glove in the glove temporary storage portion;

the glove moving and absorbing apparatus comprises at least two structural forms: the glove moving and absorbing apparatus comprises a reciprocating mobile lifting chuck group, and the reciprocating mobile lifting chuck group comprises at least a chuck capable of reciprocating translating and lifting up and down;

or the glove moving and absorbing apparatus comprises a belt absorbing mechanism, the belt absorbing mechanism comprises a belt power roller, a belt with hole, a vacuum cavity and a glove peeling board, the belt power roller drives the belt with hole to rotate; the vacuum cavity is connected with a vacuum system; the glove peeling board is arranged below the belt with hole, and the glove peeling board is tangent to the belt with hole.

10. The glove picking, organizing, and stacking apparatus according to claim 1, further comprising a correcting conveying apparatus, wherein the system control apparatus is connected to and controls the correcting conveying apparatus, the correcting conveying apparatus comprises a glove correcting conveying portion; the glove correcting conveying portion comprises a glove conveying mechanism and a glove position detecting mechanism; the glove conveying mechanism comprises a power conveying apparatus and a conveyor belt, the power conveying apparatus and the conveyor belt compose a picking conveyor belt group; and the glove position detecting mechanism is connected to and control the operation of the power conveying apparatus.

11. The glove picking, organizing, and stacking apparatus according to claim 10, further comprising a glove placing portion, wherein the correcting conveying apparatus or the glove conveying portion are engaged with the glove temporary storage portion via the glove placing portion;

when the correcting conveying apparatus is engaged with the glove temporary storage portion via the glove placing portion, the glove placing portion comprises a glove moving and absorbing apparatus, the glove moving and absorbing apparatus may absorb and transfer the gloves on the conveyor belt of the glove conveying mechanism, and place the gloves in the glove temporary storage portion;

when the glove conveying portion is engaged with the glove temporary storage portion via the glove placing portion, the glove placing portion comprises a tiling and placing conveyor belt and a glove moving and absorbing apparatus; the glove conveying portion conveys the gloves on the tiling and placing conveyor belt, the glove moving and absorbing apparatus may absorb and transfer the gloves on the tiling and placing conveyor belt, and place the glove in the glove temporary storage portion;

the glove moving and absorbing apparatus comprises at least two structural forms:

the glove moving and absorbing apparatus comprises a reciprocating mobile lifting chuck group, and the reciprocating mobile lifting chuck group comprises at least a chuck capable of reciprocating translating and lifting up and down;

or the glove moving and absorbing apparatus comprises a belt absorbing mechanism, the belt absorbing mechanism comprises a belt power roller, a belt with hole, a vacuum cavity and a glove peeling board, the belt power roller drives the belt with hole to rotate; the vacuum cavity is connected with a vacuum system; the glove peeling board is arranged below the belt with hole, and the glove peeling board is tangent to the belt with hole.

* * * * *